Inventor
Albert R. Thompson
By Lyon & Lyon
Attorneys

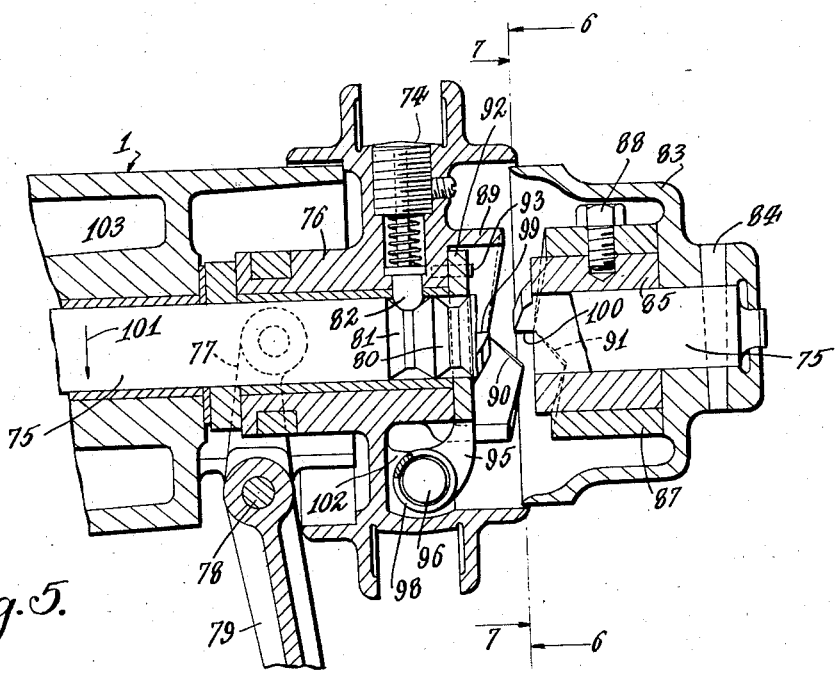

Jan. 7, 1936.  A. R. THOMPSON  2,026,806
FRUIT PITTER
Filed June 26, 1931  10 Sheets-Sheet 7

Inventor
Albert R. Thompson
By Lyon & Lyon
Attorneys

Jan. 7, 1936. A. R. THOMPSON 2,026,806
FRUIT PITTER
Filed June 26, 1931 10 Sheets-Sheet 8
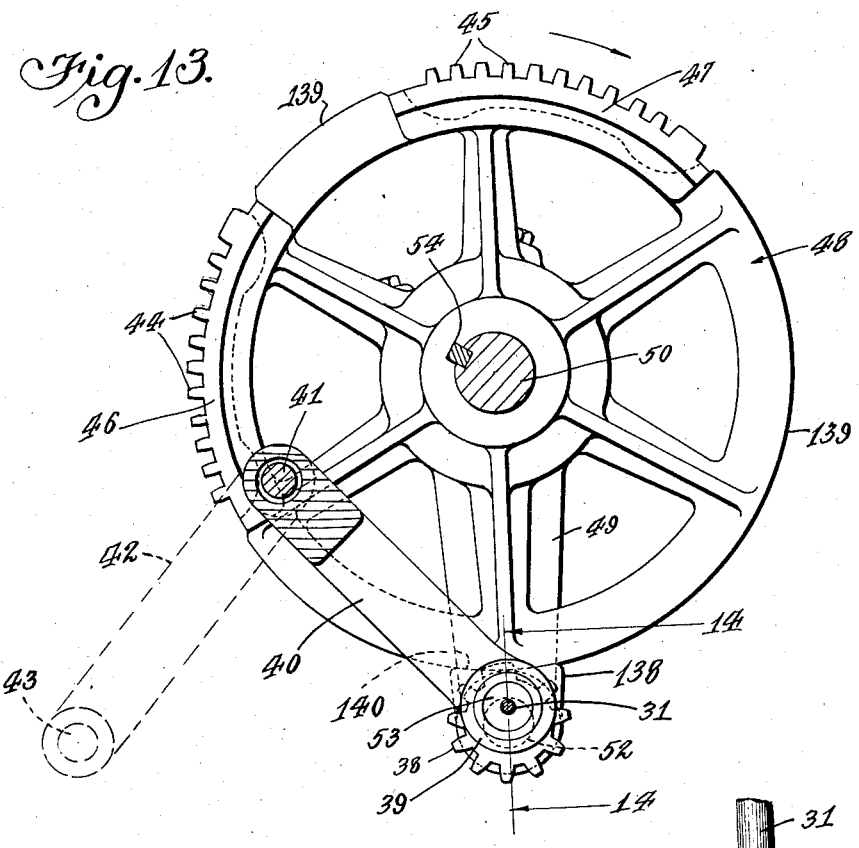
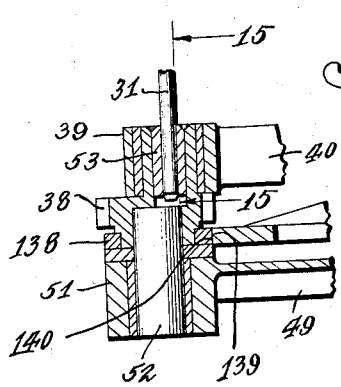
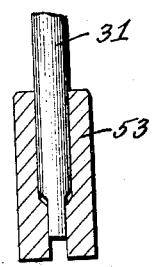
Inventor
Albert R. Thompson
By Lyon & Lyon
Attorneys Inventor
Albert R. Thompson
By Lyon & Lyon
Attorneys

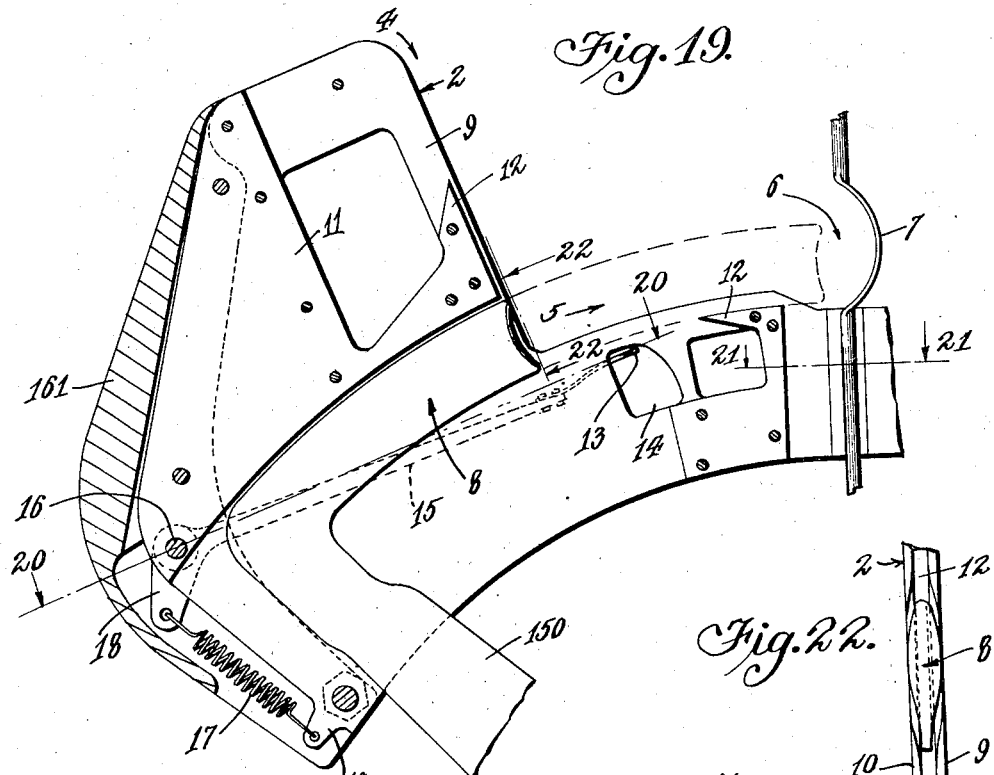
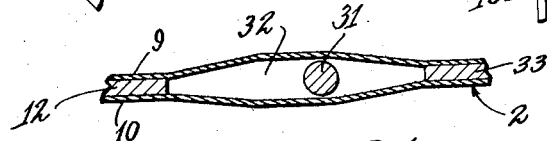
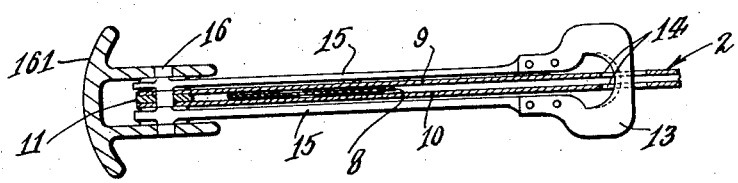

Patented Jan. 7, 1936

2,026,806

UNITED STATES PATENT OFFICE 2,026,806

FRUIT PITTER

Albert R. Thompson, San Jose, Calif., assignor to Pacific Machinery Company, San Francisco, Calif., a corporation of California Application June 26, 1931, Serial No. 546,958

18 Claims. (Cl. 146—28)

This invention relates to fruit pitters, and more particularly to a fruit pitter adapted to halve cling stone peaches and remove the pit therefrom.

An object of this invention is to provide a fruit pitter which includes means for impaling fruit to be pitted so that during the impaling operation the flesh of the fruit is cut to the pit, means for feeding the impaled fruit to a piting member, means for rotating the pitting member to sever the halves of the flesh of the fruit from the pit and for ejecting the pit from the machine as the halves of the fruit fall away from the pit.

Another object of this invention is to provide a fruit pitter including means for halving the flesh of the fruit, a curved pitting knife positioned in the halving means, and means for shifting the fruit pit toward the curved pitting means in one direction and for arresting the movement of the pit in the opposed direction.

Another object of this invention is to provide a fruit pitter including an impaling blade, means for supporting the fruit on the impaling blade when the fruit is positioned with its pit in position with relation to a pitting knife, means for moving the fruit by engagement with the pit into such position, and means operable for rotating the pitting means around the pit of the fruit to permit the halves of the fruit to fall from the pit and for ejecting the pit from the impaling means.

Another object of this invention is to provide a fruit pitter of simplified construction and which may be more easily operated by the operator and which will operate to effectively remove the pit from a cling stone peach while removing a minimum of the flesh of the peach with the pit, and operative to insure the production in the halves of the peaches formed of a clean pit cavity.

Other objects and advantages of this invention it is believed will be apparent from the following detailed description of a preferred embodiment thereof as illustrated in the accompanying drawings.

In the drawings:

Figure 5 is a fragmental enlarged sectional view of the yieldable driving clutch embodied in my invention.

Figure 6 is an end sectional view taken substantially on the line 6—6 of Figure 5.

Figure 7 is an end sectional view taken substantially on the line 7—7 of Figure 5.

Figure 11 is a detached elevation of the one-revolution clutch actuating lever embodied in my invention.

Figure 13 is a top plan view of the fruit pitter actuating gear and drive means embodied in my invention.

Figure 14 is a sectional elevation taken substantially on the line 14—14 of Figure 13.

Figure 15 is a sectional fragmental view taken substantially on the line 15—15 of Figure 14.

Figure 19 is an enlarged fragmental view partly in section of the stationary impaling member embodied in my invention illustrating the position and the movement of the fruit positioner member embodied in my invention.

Figure 20 is a fragmental view partly in section taken substantially on the line 20—20 of Figure 19.

Figure 21 is a sectional fragmental view taken substantially on the line 21—21 of Figure 19.

Figure 22 is a fragmental elevation of the end of the fruit positioner member embodied in my invention taken substantially on the line 22—22 of Figure 19.

Figure 1:
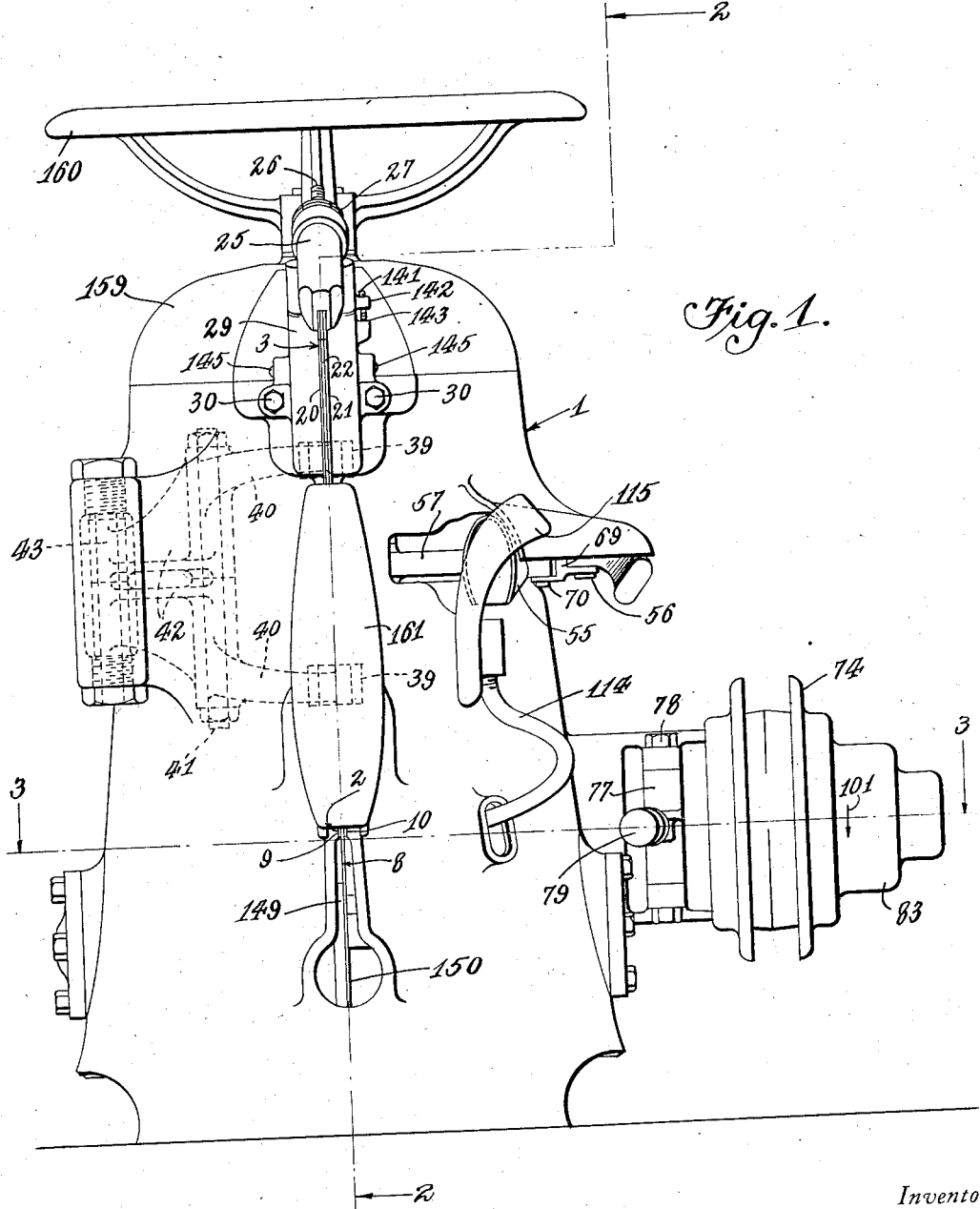
Figure 1 is a front elevation of a fruit pitter embodying my invention.

In the preferred embodiment of my invention illustrated in the accompanying drawings, there is indicated a cling stone pitter including a housing 1 which likewise provides a base support for the fruit pitter. Secured to the housing 1 is a stationary impaling blade 2 and a yieldably mounted impaling blade 3 defining between their edges a path 4 for the pit of the peach to travel as the pit is impaled upon the blades 2 and 3. At the lower extremity of the path 4 the impaling blades are formed to provide a second path 5 which extends approximately at right angles to the path 4 and terminates in a pitting recess 6 formed in the impaling blades 2 and 3.

Mounted in the pitting recess 6 is a curved pitting knife 7 which is normally positioned in the plane of the impaling blades 2 and 3 at the rear of the recess 6.

When impaling the peach upon the impaling blades 2 and 3, the operator places the peach so that the cutting edges of the blades 2 and 3 lie in a plane of the crease of the peach and the operator thrusts the peach on the impaling blades 2 and 3 with the pit traveling to the end of the path 4. The operator then releases the peach and sets into motion the pitting machine, and the pit engaging member 8 engages the pit of the fruit through the recess formed in the flesh of the fruit by the impaling blade 2 and forces the peach along the path 5 into the pitting recess 6 until the pit of the fruit contacts the curved pitting knife 7.

The impaling blade 2 is formed of a pair of ringer blades 9 and 10 which are secured together and provide a means for cutting the flesh of the fruit. Ringer blades 9 and 10 are held in spaced relation by means of a filler plate 11, and ribbon removing knives 12 are supported between the blades 9 and 10 for the purpose of removing the portion of the flesh of the fruit between the ringer blades 9 and 10.

Supported between the ringer blades 9 and 10 is a tip-removing knife 13 which extends through a recess 14 formed in the ringer blades 9 and 10 in position to engage and sever the tip from the fruit as the fruit is passed by the knife 13. The knife 13 is provided with a pair of shanks 15 which extend along the sides of the ringer blades 9 and 10 and are pivotally supported on a pivot 16 at their rear ends.

A spring 17 is secured to the spring arm 18 of the shanks 15 at one end and to a stationary lug 19 at its opposite end and normally urges the tip-removing knife 13 in position to sever the tip from the flesh of the fruit.

The impaling blade 3 is likewise formed of a pair of spaced ringer blades 20 and 21 held in spaced relation by means of a spacer blade 22. A slice removing knife 23 is positioned between the ringer blades 20 and 21 for removing the flesh of the fruit from between the ringer blades 20 and 21 as the fruit is moved through the paths 4 and 5. The impaling blade 3 is yieldably supported to move away from the impaling blade 2 so that the impaling blades 2 and 3 at all times cut the flesh of the fruit to the depth of the pit of the peach.

The impaling blade 3 is supported on a plunger 24 mounted in a tube 25. The plunger is formed with a stem 26 which projects through a cap 27 threaded to the tube 25. Between the plunger 24 and cap 27 is mounted a spring 28 which normally urges the impaling blade 3 toward the impaling blade 2. The tube 25 is mounted on an incline so that the rearward movement of the blade 3 likewise compensates for pits of different widths as they pass through the path 5 formed between the impaling blades 2 and 3.

The tube 25 is formed integral with a bracket 29 which is in turn secured to the housing 1 by means of cap bolts 30. Bracket 29 is provided with a longitudinally extended slot into which the rear edges of the impaling blade 3 extends forming a guide for the impaling blade 3 at its rear edge.

The pitting knife 7 is curved to approximate the contour of the pit of a peach in its greatest dimension, the length of the pit, and is formed integral with shanks 31 which extend from each end of the curved knife 7. The shanks 31 extend through slots 32 formed between the ringer blades of the impaling blades 2 and 3 so as to permit the movement of the shanks 31 of the curved knife 7 longitudinally of the impaling blades 2 and 3 so that the pitting knife may pass closely around the pit of the fruit to remove with the pit a minimum of the flesh of the fruit.

The slots 32 are formed by bending the ringer blades of the impaling blades 2 and 3 outwardly at their portions adjacent the pitting recess 6.

In order to provide for the use of different sized pitting knives 7 in the pitting recess 6 as may be required in order to handle different sized fruits having pits of different sizes, the back of the pitting recess 6 is provided with a shear plate 33 which is adjustably mounted at the back of the recess 6 by fitting into a cut-out recess formed in the impaling blades 2 and 3. The shear plate 33 is adjustably mounted in position on bolts 34 passed through slots 35 formed in the shear plate 33.

Means are provided for guiding the shear plate 33 consisting of a pin 36 secured to the rear edge of the shear plate 33 and riding within a hole formed through a boss 37 formed on the interior of the housing 1. The housing 1 is at the point of application of the impaling blades 2 and 3 formed to provide an inwardly extending recess in which the impaling blades 2 and 3 are positioned and in which the fruit is held during the pitting operation.

In order to actuate the pitting knives 7 to cause the same to follow closely the contour of the pit of the peach irrespective of the width of the pit, the pitting knife is caused to move substantially in the plane of the cut formed in the flesh of the fruit by the impaling blade, that is, the axis of the curved pitting knife is moved during the rotation of the curved pitting knife in order that the curved pitting knife will follow closely the curvature of the pit but will pass around the laterally projecting pins which project outwardly from the pit.

In order to shift the axis of the curved pitting knife 7 and to rotate the curved pitting knife 7 around the pit of the peach, the following means are provided:

The shanks 31 of the curved pitting knife 7 are releasably secured at their ends to eccentric pinions 38 which are journaled in bearing members 39 mounted at the end of the pivotally supported yoke 40. The yoke 40 is formed of two sections bolted together by means of a bolt 41. An arm 42 of the yoke 40 is pivotally supported on a pivot pin 43 supported in a boss cast integral with the housing 1.

The yoke 40 permits the axis of the curved knife 7 to move as the eccentric pinions 38 are rotated substantially in the plane of the impaling blades 2 and 3 which operate to restrain the axis of the pitting knife 7 from movement in a direction transverse of the impaling blades 2 and 3.

Means are provided for holding the pinions 38 in position to mesh with the teeth 44 and 45 of the gear segments 46 and 47 formed on the periphery of the gear wheels 48. This means preferably comprises a pair of links 49 which are journaled on the main shaft 50 of the pitter. Passing through the bosses 51 of the links 49 are bearing pins 52 which fit axially into the eccentric gears 38 and provide the axis around which the eccentric pinions 38 rotate when driven by the gear teeth of the gear segments 46 and 47. The shanks 31 of the pitting knife 7 pass axially into the eccentric hubs 53 of the pinions 38.

The gear wheels 48 are keyed as indicated at 54 to the main shaft 50 of the pitter and are driven with this shaft.

Means are provided for holding the fruit on the impaling blade formed of the blades 2 and 3 during the rotation of the printing knife 7, which means preferably include a holding cup 55 which is pivotally mounted on a pin 56 carried by an arm 57.

The arm 57 is fulcrumed on a pin 58 supported within the housing 1. The opposite end of the arm 57 is pivotally secured to a pin 59 carried by a yoke 60. The yoke 60 is provided at its opposite end with a guide pin 61 which travels in a guide cylinder 62. The guide cylinder 62 is pivotally supported in a pocket 63 formed on the inner periphery of the housing 1. A spring 64 is interposed between the flange 65, the guide cylinder 62 and the flange 66 of the yoke 60 in position to normally urge the flanges 65 and 66 apart and thereby normally urge the holding cup 55 in position to engage and support the fruit on the impaling blade.

The pivot points formed by the pins 58, 59 and the pivot of the cylinder 62 positioned within the pocket 63 are out of line so that the cup 55 is normally urged into position to engage and hold the fruit on the impaling blade.

Should the operator desire to move arm 57 so that the blade will not engage and hold the fruit on the impaling blade, he merely swings the arm 57 on its pivot 58 until the pin 59 passes to the other side of the line between the pivot 58 and the center of the pivot mounted in the pocket 63, thereby rendering inoperative the means for moving the holding cup 55 in position to grip and hold the fruit.

Carried by the arm 57 is a cam roller 67 which engages with a cam 68 secured to the main shaft 50. The cam 68 normally acts to hold the cup out of engaging position upon rotation of the shaft 50 and permits the spring 54 to act to force the arm 57 to position to engage and hold the fruit on the impaling blade.

In order to permit the cup 55 to travel with the fruit supported on the impaling blade, a link 69 couples the cup 55 with the pin 56. The link 69 is pivotally mounted on the pin 56 at one end and is pivotally mounted on the cup pin 70 at its opposite end.

In order to yieldably retain the cup 55 in fruit-engaging position, a spring 71 is provided which is connected between a lug 72 formed on the arm 57 and a lug 73 formed integral with the cup 55. In order to actuate the pit-engaging member 8 to rotate the pitting knife 7, and to permit the holding cup 55 to be actuated, means are provided for rotating the main shaft 50 through one revolution to actuate the pit-engaging member 8 to move the fruit into the pitting recess 6 and return the engaging member 8 to its starting position to rotate the pitting knives 7 through one revolution to sever the halves of the fruit from the pit and to then rotate the pitting knife 7 through a second revolution to cause the pit to be ejected from the pitting recess 6 and to permit the holding cup 55 to be moved to its fruit-engaging position to hold the fruit on the impaling blade during the pitting operation, and then release the halves of the fruit to permit the same to fall from the impaling blade after they have been cut from the pit of the fruit and to then restore the holding cup 55 to its non-operating position where a further peach may be moved onto the impaling blade with its pit within the pitting recess 6.

It is essential in this operation that the pitting knife 7 be arrested in its rotation in the plane of the impaling blade so that the impaled fruit will pass over the pitting knife as it is moved along the impaling blade. It is essential that the driving mechanism be provided with a yieldable drive so that should the pitting knives 7 hang up on the pit and fail to pass freely around the pit, the pitting knives will not be broken but the drive connection will be released. In order to accomplish this timed operation and yieldable drive, the following drive means are preferably provided:

The power for actuating the pitting mechanism is supplied through a pulley 74 which is journaled on a countershaft 75 extending horizontally from the housing 1.

The hub 76 of the pulley 74 is mounted on the shaft 75 so as to move longitudinally of the shaft 75 into and out of position to engage and drive the shaft 75.

In order to shift the pulley 74 to and from engaging position, a shifting fork 77 is provided which is pivotally mounted in pin 78 carried by the housing 1. The handle 79 of the shifting fork 77 projects forwardly from the shaft 75 to a position where it may be engaged by the operator of the pitting machine. The shaft 75 is provided with a pair of grooves 80 and 81 into either of which a spring-pressed dog 82 carried by the pulley 74 is adapted to be positioned. The spring-pressed dog 82 acts to yieldably hold the pulley 74 in or out of driving position.

Secured to the end of the shaft 75 is a clutch collar 83 which is pinned to the shaft 75 by means of a pin 84. Mounted on the shaft 75 within the clutch collar 83 is a clutch ring 85 which is keyed by a key 86 to the shaft 75.

Mounted on the clutch ring 85 is a cam ring 87. The cam ring 87 is secured to the clutch ring 85 by means of cap bolts 88. A cam flange 89 is formed integral with the drive pulley 94, and complementary cam faces 90 and 91 are formed in the cam ring 87 and the cam flange 89 respectively.

Journaled on the shaft 75 is a yieldable drive clutch ring 92 which is secured to the hub 76 on the pulley 74 by means of pins 93 which are positioned within arcuate slots 94 formed in the yieldable drive ring 92. The drive ring 92 is formed with an integral arm 95 which carries a spring lug 96 at its outer end. A spring stop 97 is formed integral with a casting forming the pulley 74 and a spring 98 is interposed between the spring lug 96 and the spring stop 97 and acts to yieldably urge the arm 95 away from the spring stop 97.

Figure 3:
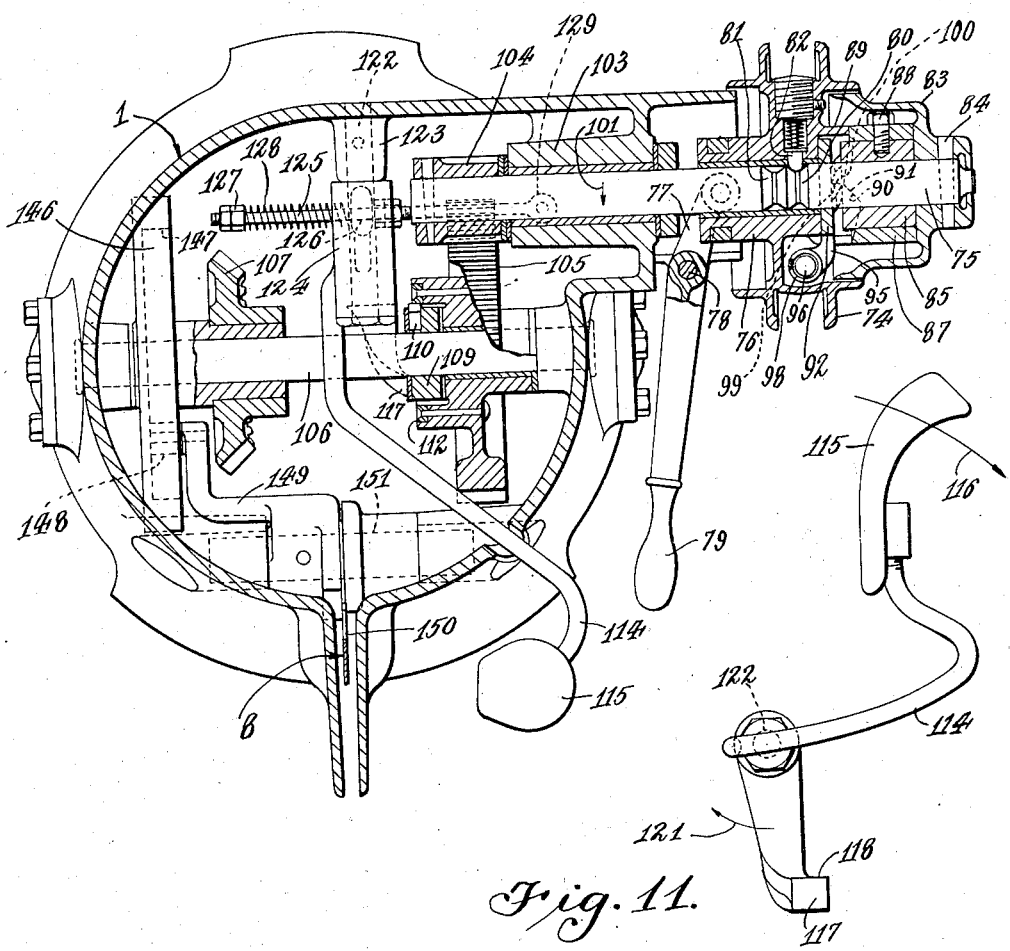
Figure 3 is a sectional plan view taken substantially on the line 3—3 of Figure 1.
Figure 4:
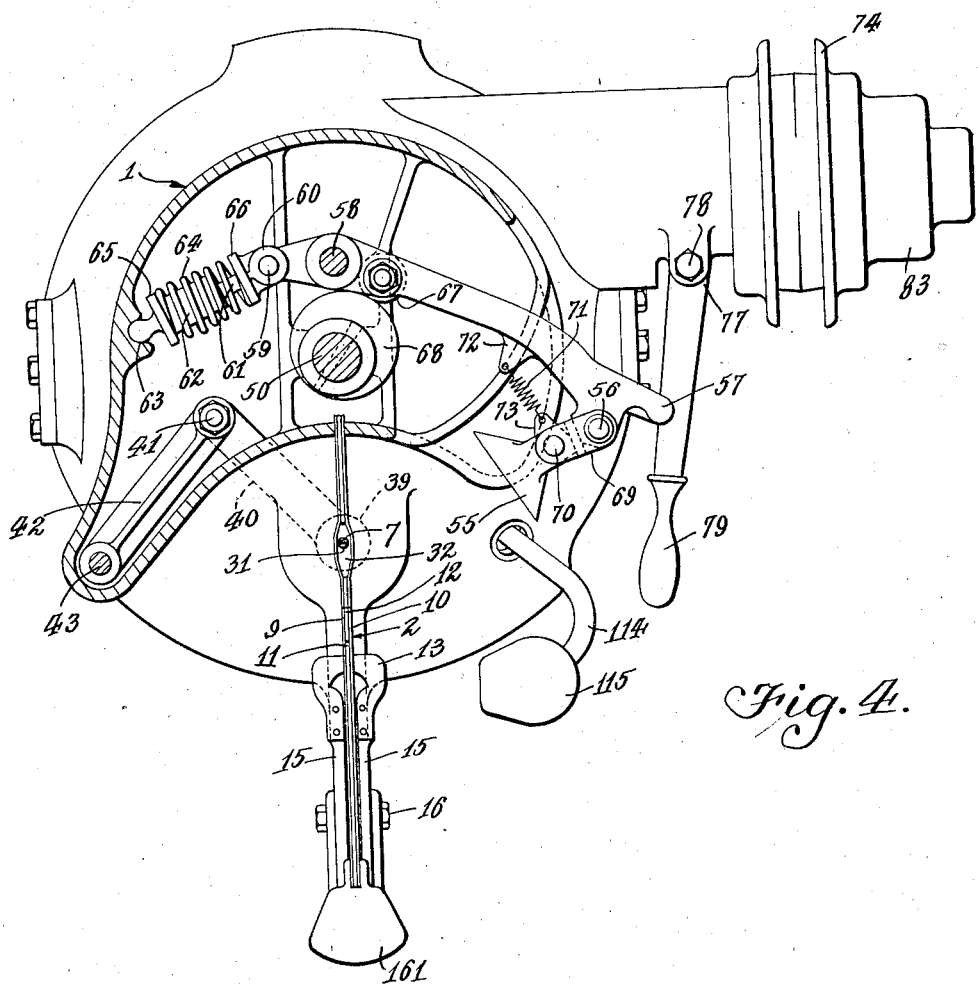
Figure 4 is a plan view taken substantially on the line 4—4 of Figure 2.

Formed on the yieldable clutch drive ring 92 are clutch faces 99. Complementary clutch faces 100 are formed on the clutch ring 85. The shaft 75 is rotated in the direction of the arrows 101 of Figures 5, 6 and 7. The yieldable driving clutch thus provided forms a yieldable drive so that when more than a predetermined resistance to the driving of the shaft 75 is set up in the fruit pitter such, for example, as by the pitting knives 7 hanging up on the pit, the clutch is thrown out to stop further driving of the shaft 75 and hence the curved pitting knife 7. This operation is as follows:

The shaft 75 rotating in the direction of the arrow 101 and with the clutch pulley 74 shifted to engaging position as shown in Figure 3, the clutch faces 99 and 100 are in engagement to drive the shaft 75 from the pulley 74 in the direction of the arrows 101. The cam faces 90 and 91 are in engagement. The yieldable clutch ring drives the clutch collar 83, and hence the shaft 75, due to the fact that the arm 95 thereof is in engagement with the driving stop 102 carried by the pulley 74 and the pins 93 are at the ends of the slots 84. A positive drive is thus set up from the pulley 74 to the shaft 75. When the rotation of the shaft 75 in the direction of the arrow 101 is retarded, the yieldable clutch ring 92 travels faster than the shaft 75, compressing the spring 98, and as the collar 83 is rotated more slowly than the pulley 74, the cam face 90 rides outward on the cam face 91, causing pulley 74 to be shifted longitudinally of the shaft 75 until the spring locking lug 82 passes out of the groove 80 into groove 81 of the shaft 75 and the driving connection between the pulley 74 and the shaft 75 is broken.

This yieldable clutch is normally in engagement so that the operator does not have to operate the clutch handle 79 except in case of the pitting knife hanging up on a pit and breaking the yieldable drive connection provided.

The shaft 75 is journaled in a bearing 103 formed in the housing 1 and at its inner end is provided with a pinion 104 which meshes with the drive gear 105 of a one revolution clutch. This one revolution clutch is the actuating clutch of the pitting machine and is formed so that the main shaft 50 of the pitting machine is rotated to a single revolution for each pitting operation.

Figure 8:
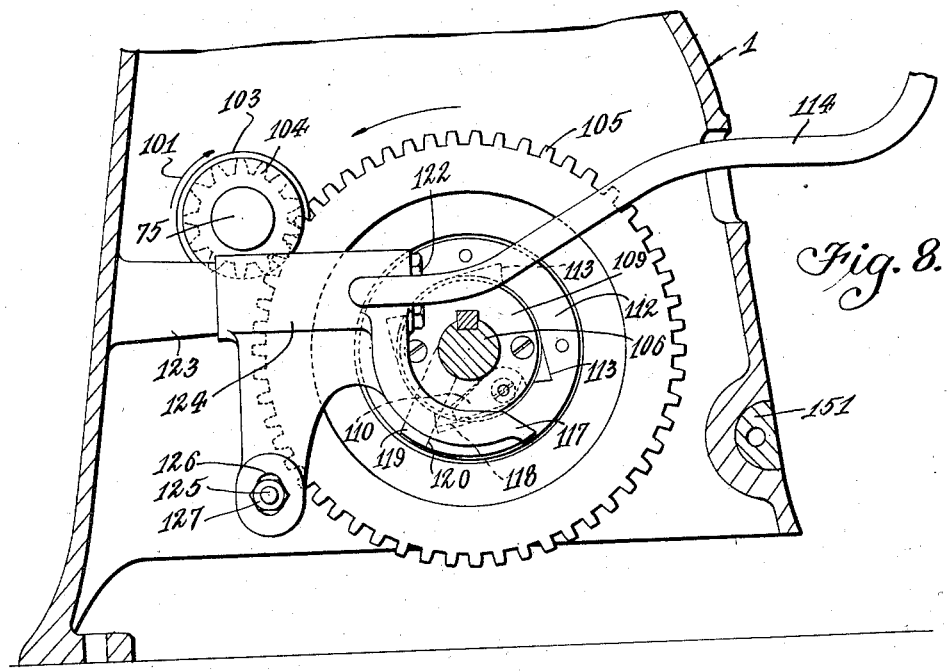
Figure 8 is an enlarged fragmental view of the one-revolution clutch embodied in my invention partly in vertical section.
Figures 9, 10:
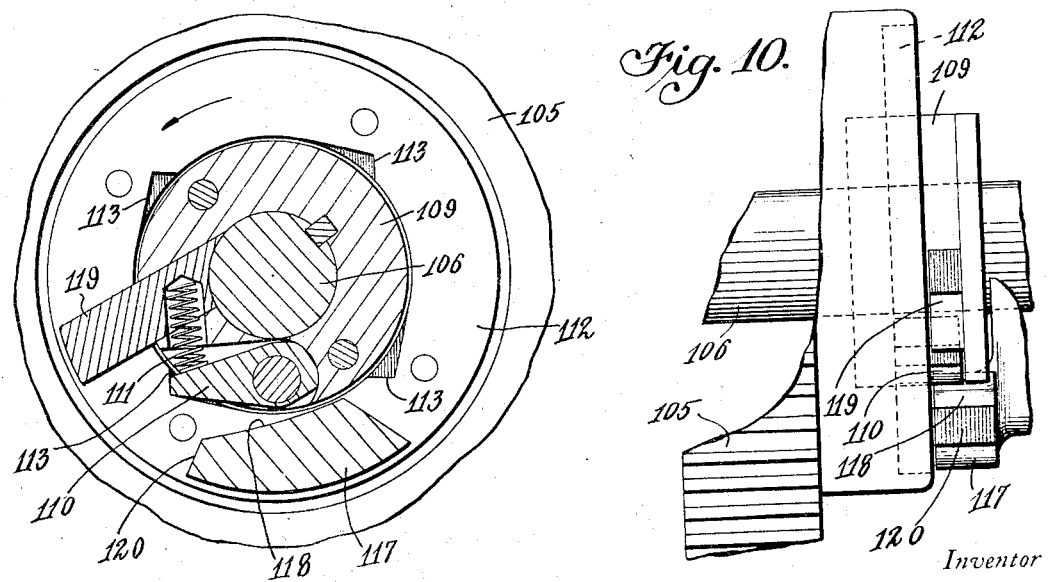
Figure 9 is an enlarged fragmental elevation partly in section of the one-revolution clutch embodied in my invention illustrating the clutch as engaged.
Figure 10 is an enlarged fragmental edge elevation of the one-revolution clutch illustrated in Figures 8 and 9.
Figure 12:
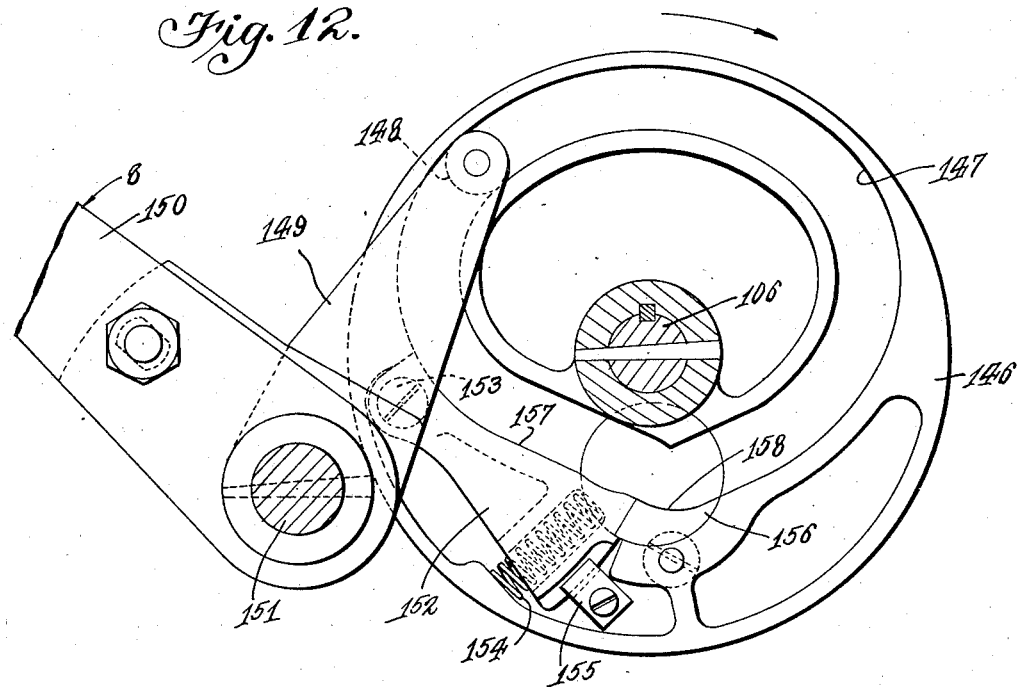
Figure 12 is a top plan view partly in section of the cam actuating means for the fruit positioner member embodied in my invention.
Figure 23:
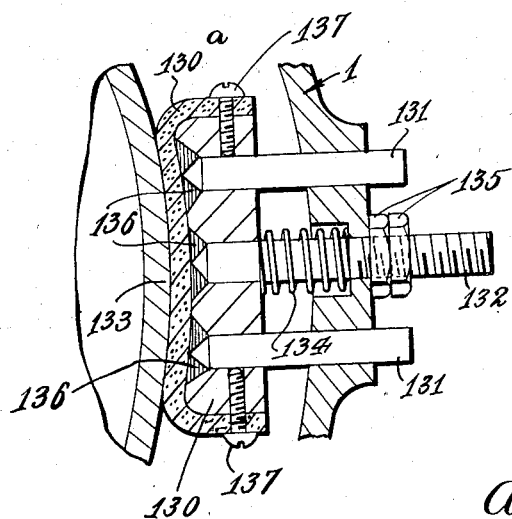
Figure 23 is a fragmental elevation in horizontal section taken substantially on the line 23—23 of Figure 3 illustrating the rotation retarding means embodied in my invention for arresting the rotation of the pitting member in the plane of the impaling blade.
Figure 16:
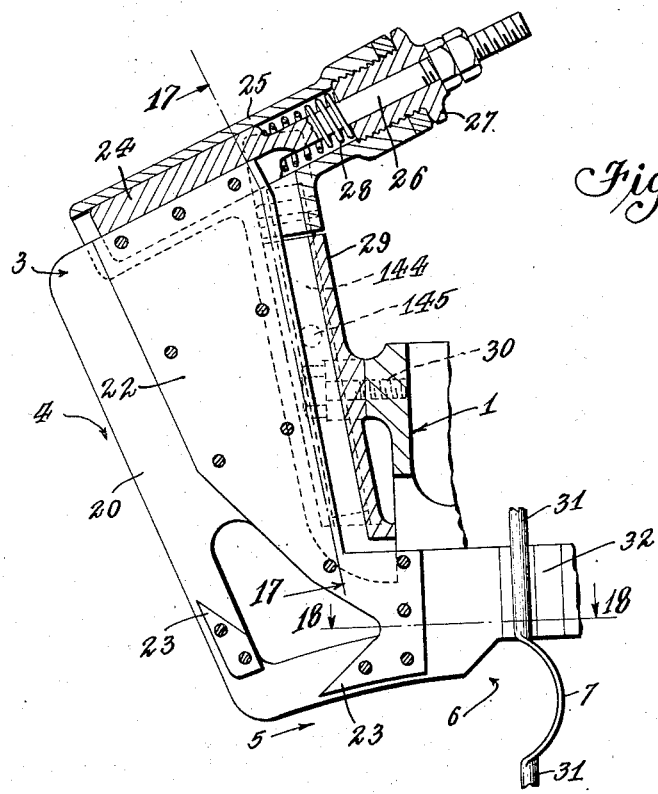
Figure 16 is a side elevation partly in section from the yieldable impaling blade embodied in my invention.
Figure 17:
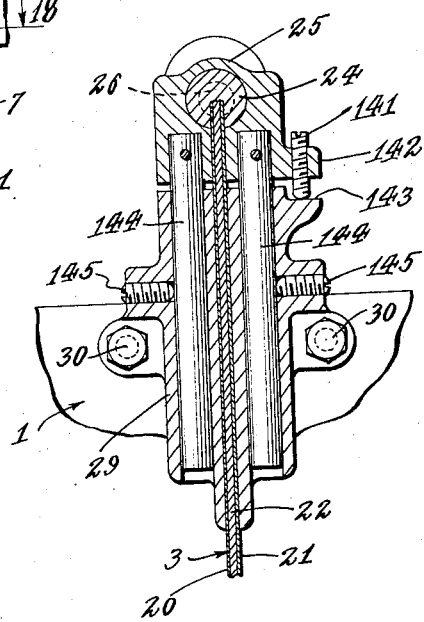
Figure 17 is a sectional edge view taken substantially on the line 17—17 of Figure 16.
Figure 18:
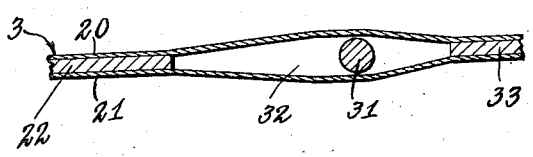
Figure 18 is a sectional fragmental view taken substantially on the line 18—18 of Figure 16.

The one revolution clutch gear 105 is journaled on the operating clutch shaft 106. The operating clutch shaft 106 is secured to a drive pinion 107 which meshes with the bevel pinion 108 secured to the main shaft 50 of the pitting machine. The one revolution clutch is specifically illustrated in Figures 8, 9 and 10.

Keyed to the shaft 106 is a clutch drive ring 109. The clutch drive ring 109 carries a pivotally mounted clutch dog 110 which is yieldably urged into engaging position by means of a spring 111. A clutch ring 112 is secured to the clutch gear 105.

The clutch dog 110 is adapted to engage within any one of a plurality of clutch pockets 113 formed in the clutch ring 112. The clutch operating handle 114 projects from the housing 1 and at its outer end is provided with hand pad 115 which is gripped by the operator and pushed in the direction of the arrow 116. At the opposite end clutch operating rod 114 is secured to a clutch cam member 117 which provides a cam surface 118 adapted to engage the dog 110 to move the dog 110 out of the pocket 113 of the clutch ring 112. As the dog 110 is thus moved out of engagement with the clutch ring 112, a stop bar 119 carried by the clutch ring 109 engages the end face 120 of the clutch cam member 117 to arrest rotation of the shaft 106. When the pad 115 is pressed by the operator in the direction of the arrow 116, clutch cam member 117 is rotated in the direction of the arrow 121. This moves the end of the cam member 117 out of engagement with the dog 110 and permits the stop member 119 to pass the cam member 117 and as the clutch ring 112 is driven with the gear 105, the dog 110 falls into one of the pockets 113 and the clutch ring 109 is then driven through one revolution, thereby driving the shaft 106 through one revolution as the clutch rod 114 is released to permit the cam member 117 to return to its arresting position to cause the dog 110 to ride out of the pocket 113 and the arm 119 to engage the end 120 of the cam member 117 and arrest further rotation of the shaft 106.

In order to at all times maintain the operating rod 114 in position to move the cam member 117 to obstructing position, the cam dog 117 is mounted within the housing 1 on a pin 122 supported in a boss 123 of the housing 1 and projecting into a cylinder sleeve 124 formed integral with the rod 114. The pin 122 provides the pivot around which the rod 114 rotates in shifting the position of the cam member 117.

In order to hold the cam member 117 in obstructing position, cylinder 124 is provided with a boss through which a rod 125 is passed. The rod 125 passes the boss of the cylinder 124 through a slot 126 to permit relative movement of the rod and cylinder 124 as the cylinder 124 is rotated.

Interposed between the boss of the cylinder 124 and a nut 127 threaded to the end of the rod 125 is a spring 128 which normally holds the rod 114 yieldably in position to move the cam member 117 into obstructing position. The opposite end of the rod 125 is provided with an eye 129 through which a pin passes for anchoring the rod 125 to the housing 1. As the shaft 50 is rotated through one revolution, the gear wheels 48 are likewise rotated through one revolution.

As the gears 48 are rotated through a single revolution, the gear segments 47 rotate the pitting knife 7 through one revolution to sever the halves of the peach from the pit. The gear segments 46 then operate to rotate the pitting knife 7 through a second revolution for the purpose of engaging and ejecting the pit from within the pitting recess 6 of the impaling blade.

In order to prevent the shaft 50 from drifting, due to slight friction, I provide a brake consisting of a brake shoe 130 mounted on pins 131 and 132 projecting through bores formed through the housing 1 in position to engage the gear wheel brake shoe 133 as the pinions 38 pass out of engagement with the gear segment 46 and to hold the pinions from rotation during the interval of time that the gear wheel is rotating from the position at the end of the gear segment 46 to the start of the teeth of the gear segment 47. The pin 132 is provided with a spring 134 interposed between the shoe 130 and the housing 1 to yieldably urge braking shoe 130 into braking position. The pin 132 is threaded and provided with nuts 135 for adjusting the position of and locking brake shoe 130 in its adjusted position.

The pins 131 and 132 are at their inner ends tapered and brazed as indicated at 136 to the brake shoe 130. Screws 137 are provided for holding a brake facing material 130a on the face of the brake shoe 130.

In order to hold the pitting knife 7 from rotation as the gear segments 46 pass out of engagement with the pinions 38, lock washers 138 are secured to the pinions 38. Rotation stop rims 139 are formed on the gears 48 between the gear segments 46 and 47 in position to engage the arcuate faces 140 of the lock washers 138, thus holding the pinions 38 from rotating until the shoulders formed by the arcuate faces of the lock washers 138 pass off from the rims 139 at which interval or intervals the pinions 38 mesh with the gear segments 47 and 46 respectively.

In order to adjust the vertical position of the yieldably mounted impaling blade 3 so as to define the width of the path 5, an adjusting screw 141 is threaded through a lug 142 formed integral with the cylinder 25 in position to engage a shoulder 143 of the bracket 29. The cylinder 25 is supported in the bracket 29 by means of a pair of bars 144 which fit within slots formed in the bracket 29.

Centering screws 145 are provided for centering and guiding the bars 144 in the slots of the bracket 29.

In order to drive the pusher member 8 in timed relation with the operation of the pitting mechanism so that the pusher member 8 will feed the peaches to the pitting knife 7 at the proper moment of operation, the following means are preferably provided:

Mounted on the clutch shaft 106 is a cam 146. The cam 146 is secured to the shaft 106 and is driven through one revolution as the shaft 106 is driven through one revolution. The cam 146 is an internal cam providing a cam race 147 in which a cam roller 148 rides. The cam roller 148 is carried by the arm 149 secured to the shank 150 of the pusher member 8. The shank 150 is pivotally mounted on a pin 151 secured to the housing 1.

In order to yieldably force the pusher member 8 to yieldably urge the pit into its proper position in relation to the pitting knife 7, the cam 146 is formed with a yieldable gate 152 which is pivotally secured to the main body of the cam 146 by means of a pin 153. Mounted within the cam 146 is a spring 154.

The spring 154 normally urges the gate 152 inwardly toward the shaft 106. The gate 152 is guided by means of a clip 155 secured to the face of the cam 146. A cam insert 156 is mounted in the face of the cam 146 and provides a portion of the cam race 147 in which the cam roller 148 rides.

The face 157 of the yieldably mounted gate 152 provides a portion of the cam race-way and the insert 156 provides another portion and is formed and inserted merely to make the formation of the cam race-way 147 more easy to produce.

The gate 152 yieldably urges the cam roller 148 in a direction to maintain the pusher member 8 in contact with the pit of the fruit during the pitting operation. When the fruit has been positioned in relation to the pitting knife 7, and in order to permit pitting knife 7 to freely operate, the roller 148 passes onto the flat portion 157 of the cam race-way 147 as the pitting knife 7 starts to rotate. This passing of the roller 148 onto the flat portion 157 of the cam race-way 147 relieves any pressure of the pusher member 8 against the pit of the fruit, and hence against the pitting knife 7, permitting the pitting knife 7 to freely rotate.

As the pitting knife 7 proceeds to rotate from its starting position, the pit is allowed to recede in the recess 6 outwardly toward the front of the recess 6 following the movement of the pusher member 8 until it is contacted with the end of the pusher member 8 and is positioned just within the radius of the pitting knife 7.

As the pitting knife 7 reaches a position 180° from its starting position where it will again pass the pit in the plane of the impaling blade and will tend to pass at this point over the fins of the pit, the pusher member is quickly retarded a slight distance to permit the knife 7 to pass around the pit without engaging the end of the pusher member 8. To permit the pusher member 8 to retard at this point, the cam roller 148 passes into a depression 158 formed in the cam-way 147. As the pitting knife 7 passes the fin of the fruit in the impaling blade, it urges, when passing through its second 180°, the pit of the fruit backwardly in the pitting recess 6 to a position adjacent the shear plate 33 mounted at the back of the pitting recess 6. The time of rotation of the pitting knife in relation to the cam 146 may be determined by the relative position of the cam 146 with relation to the position of the gear wheels 48 as illustrated in Figure 2.

Figure 2:
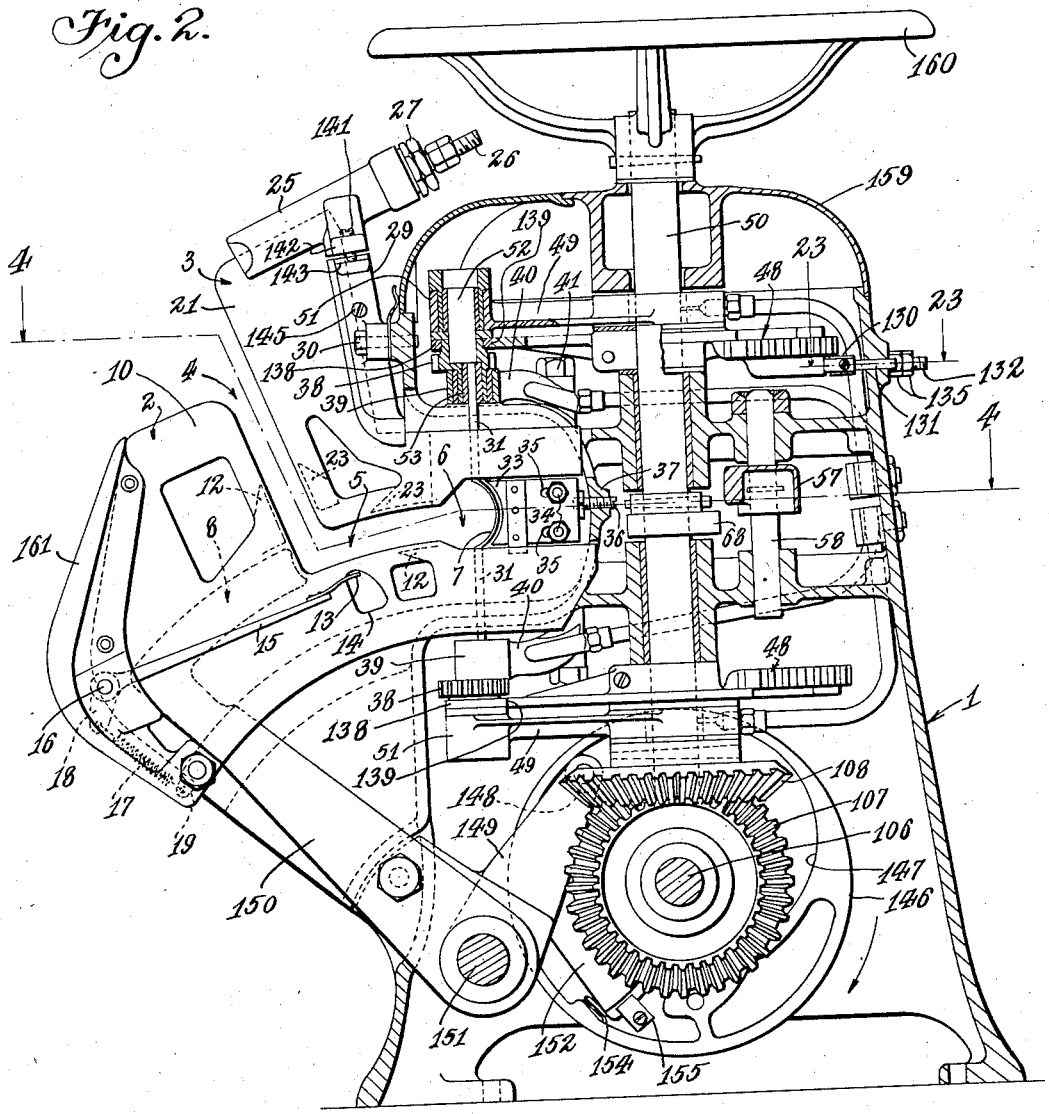
Figure 2 is a side elevation thereof partly in vertical mid-section and taken substantially on the line 2—2 of Figure 1.

After the halves of the fruit have been severed from the pit by the pitting knife 7, the pusher member 8 slowly returns to its starting position as indicated in Figure 2.

The housing 1, together with its cap 159, completely encloses the operating mechanism of the pitting machine embodying my invention to prevent the operating mechanism from being attacked by the juices of the peaches or fruit as they are pitted.

In order to provide for the hand rotation of the pitting machine in the event of a storage during the operation, a hand-wheel 160 is secured to the upper end of the main shaft 50 above the cap 159.

As illustrated in Figure 15, the shanks 31 of the pitting knives are squared at their ends to fit within bushings having squared holes which are welded to the bearing member 39 of the yoke 40, thus providing for an easy manner of assembling the pitting knives and driving the same.

A guard 161 is secured to the forward face of the impaling blade 2 to guard the hands of the operator while impaling the fruit upon the impaling blade formed of the impaling members 2 and 3.

Having fully described my invention, it is to be understood that I do not wish to be limited to the details herein set forth, but my invention is of the full scope of the appended claims.

I claim:

1. In a fruit pitter, the combination of an impaling blade providing a path through which the pit of the fruit travels as the flesh of the fruit is severed to the pit, the path being formed to provide a portion extending at an angle from another portion of the path, a pitting member located at the end of the path, pusher means located substantially at the turn in the path to engage the pit of the fruit through the cut formed in the flesh of the fruit and adapted to propel the fruit along the second portion of the path of the pit to locate the pit of the fruit in relation to the pitting means, means for actuating the pusher means, and means for actuating the pitting means in timed relation with the pusher means.

2. In a clingstone peach pitter, the combination of an impaling blade having an angular path for the pit of the peach, and pusher means located substantially at the curve of said path to engage the pit of the peach and propel the peach along the remainder of the impaling blade by engagement with the pit through the cut formed in the flesh of the peach.

3. In a clingstone peach pitter, the combination of an impaling blade having a pit path formed in two sections extending at an angle from each other, the peach being impaled on said blade to sever the flesh of the peach to the pit, means engaging the fruit substantially at the curve thereof to propel the fruit through the remainder of said path, and means for actuating the latter said means.

4. In a device of the class described, the combination of an impaling blade upon which fruit to be pitted is impaled, the impaling blade being formed to provide a pit path formed in two connected sections extending at an angle from each other, means at the end of the path for pitting the fruit, pusher means for moving the fruit along the latter section of the path into position in relation to the pitting means, and means for actuating the pitting means in timed relation to the pusher means.

5. In a fruit pitter, the combination of a fixed impaling member, a movable impaling member, the impaling members providing a path between them for the pit of the fruit, and defining an impaling blade on which the fruit is adapted to be impaled by hand, a pitting member mounted at the end of the path, means for engaging the impaled fruit and moving the same along the impaling blade into position in relation to the pitting member, and means for actuating the fruit pitting means in timed relation with the fruit engaging means.

6. In a fruit pitter, the combination of a bifurcated impaling member providing a two-part curved path for the pit of the fruit and having a pitting recess at the end of the bifurcation, the impaling member providing a means on which the fruit is impaled by hand with its pit in the bifurcation, and means for engaging the fruit after it has been impaled on the impaling blade and moved through the first portion of the path, and moving the same along the second portion of the path of the impaling member to move the pit into and to locate the pit in said pitting recess.

7. In a fruit pitter, the combination of a bifurcated impaling member forming a two-part curved path for the pit of a fruit providing a pitting recess at the end of the bifurcation, the impaling member providing a means on which the fruit is impaled by hand with its pit in the first part of the path, a curved pitting knife mounted in the pitting recess, and pusher means for engaging the pit of the fruit lying in the bifurcation after it has been impaled on the impaling member and moved through the first part of the curved path, and for moving the same along the second part of the path to move the pit into and to locate the pit in the pitting recess in position in relation to the curved pitting knife.

8. In a fruit pitter, the combination of a fixed impaling member, a movable impaling member, the impaling members providing a two-part curved path between them for the pit of the fruit and defining an impaling blade on which the fruit is adapted to be impaled by hand, a pitting member mounted at the end of the path in a pitting recess formed in the impaling member at the end of the path, pusher means for engaging the impaled fruit and moving the same along the second part of the path from the curve thereof into and to position in the pitting recess to contact the pitting member, and means for actuating the fruit pitting means in timed relation with the pusher means.

9. In a fruit pitter, the combination of a bifurcated impaling member providing a pitting recess at the end of the bifurcation, the bifurcated impaling member being formed of spaced ringer blades, the impaling member providing a means on which the fruit is adapted to be impaled with the pit of the fruit in the bifurcation, and means operable between the ringer blades to engage the pit of the fruit to move the fruit along the impaling member and to locate the pit of the fruit in the pitting recess.

10. In a fruit pitter, the combination of a fixed impaling blade formed of a pair of spaced ringer blades, a movable impaling member formed of a pair of spaced ringer blades, the impaling members providing a path between them for the pit of the fruit and defining an impaling blade on which the fruit is adapted to be impaled, a pitting member mounted at the end of the path, pusher means operable between the spaced ringer blades to engage the pit of the impaled fruit to move the impaled fruit along the impaling blade to position the pit of the fruit in relation to the pitting member, and means for actuating the fruit pitting means in timed relation with the fruit engaging means.

11. In a clingstone peach pitter, the combination of an impaling blade, the impaling blade being formed with a pair of spaced ringer blades and being formed to provide an angular path for the pit of the peach, pusher means located substantially in the curve of said path to engage the pit of the peach and propel the peach along the remainder of the impaling blade, the pusher means being operable between the ringer blades to engage the pit of the peach through the cut formed by the spaced impaling blade in the flesh of the peach.

12. In a clingstone peach pitter, the combination of an impaling blade, the impaling blade being formed with a pair of spaced ringer blades, the impaling blade being formed to provide an angular path for the pit of the peach, means carried between the spaced ringer blades for removing a slice of the flesh of the peach between the ringer blades, and pusher means located substantially at the curve of said path beyond said slice removing means and operable between the ringer blades to engage the pit of the peach at the cut formed in the flesh of the peach by the removal of said slice to propel the peach along the remainder of the impaling blade.

13. In a clingstone peach pitter, the combination of an impaling blade, the impaling blade being formed with a pair of spaced ringer blades, the impaling blade being formed to provide an angular path for the pit of the peach, means carried between the spaced ringer blades for removing a slice of the flesh of the peach between the ringer blades, and pusher means located substantially at the curve of said path beyond said slice removing means and operable between the ringer blades to engage the pit of the peach at the cut formed in the flesh of the peach by the removal of said slice to propel the peach along the remainder of the impaling blade, and a tip removing knife yieldably mounted in the path of the fruit beyond the curve of said path to engage and trim the tip of the fruit from the peach as it is propelled along the impaling blade by said pusher means.

14. In a fruit pitter, the combination of a housing, an impaling blade supported by said housing, a curved pitting knife normally lying in the plane of the impaling blade in a pitting recess formed in said impaling blade, means for engaging and holding the fruit on the impaling member during the pitting operation, a countershaft projecting from the housing, a driving pulley mounted on said shaft, a yieldable clutch for driving the countershaft from the driving pulley, an operating clutch shaft journaled within the housing, a one revolution clutch mounted within said housing on the operating clutch shaft, means for engaging shaft clutch from the exterior of the housing to rotate said operating clutch shaft through a single revolution, a main shaft journaled in said housing, means for driving the main shaft from the operating clutch shaft, means for rotating the curved pitting knife from the main shaft, and means mounted on said main shaft for normally holding the fruit holding means normally out of fruit engaging position, and operable to permit same holding means to engage said fruit in timed relation to the operation of said pitting means.

15. In a fruit pitter, the combination of a housing, an impaling blade supported by said housing, a curved pitting knife normally lying in the plane of the impaling blade in a pitting recess formed in said impaling blade, pusher means for engaging fruit impaled upon the impaling blade to position the pit of the fruit in the pitting recess with relation to the curved pitting knife, means for engaging and holding the fruit on the impaling member during the pitting operation, a countershaft projecting from the housing, a driving pulley mounted on said countershaft, a yieldable clutch for driving the countershaft from the pulley, an operating clutch shaft journaled within the housing, a one revolution clutch mounted within said housing on the operating shaft, means for engaging such one revolution clutch from the exterior of the housing to rotate said operating clutch shaft through a single revolution, a timing cam mounted on the clutch operating shaft and operable to actuate the pusher means in timed relation with the operation of the curved pitting knife, a main shaft journaled in said housing, means for driving the main shaft from the operating clutch shaft, means for rotating the curved pitting knife from the main shaft, and means mounted on said main shaft for normally holding the fruit holding means out of fruit engaging position, and operable to permit the said holding means to engage said fruit in timed relation to the operation of said pitting means.

16. In a fruit pitter, the combination of a yieldably mounted impaling member, a bracket for supporting said impaling member, a cylinder, a pair of guide members secured to said cylinder and slidably mounted in said bracket, a plunger mounted in said cylinder, and a spring member for yieldably urging said plunger into advanced position.

17. In a fruit pitter, the combination of a housing, a fixed impaling member secured on the exterior of said housing, a yieldably mounted impaling member mounted on the exterior of said housing in spaced relation to the fixed impaling member to provide a path between said impaling members through which the pit of the fruit is adapted to pass, a bracket for supporting the yieldably mounted impaling member, a cylinder, a pair of guide members secured to said cylinder and slidably mounted in said bracket, a plunger mounted in said cylinder, and a spring member for yieldably urging said plunger into advanced position to urge the yieldably mounted impaling member toward the fixed impaling member to yieldingly restrict the path through which the pit of the fruit travels.

18. In a clingstone peach pitter, the combination of an impaling blade formed of two sections providing a two-part path for a fruit pit, the two parts of the path extending at an angle from each other and onto which impaling blade a peach to be pitted is impaled by hand to sever the flesh of the peach to the pit, a pitting means, means adapted to engage the fruit after it has been impaled upon the impaling blade for pushing the peach along the second part of the path formed by the impaling means to complete the severing of the flesh of the fruit, and to locate the fruit in relation to the pitting means.

ALBERT R. THOMPSON.